US012062261B2

(12) United States Patent
Czyzewski et al.

(10) Patent No.: US 12,062,261 B2
(45) Date of Patent: Aug. 13, 2024

(54) METHOD AND DEVICE FOR IMPLEMENTING WAGERING GAMES REQUIRING PLAYER INPUT

(71) Applicant: AGS LLC, Las Vegas, NV (US)

(72) Inventors: Zbigniew Czyzewski, Las Vegas, NV (US); Michael Skvorzov, Las Vegas, NV (US)

(73) Assignee: AGS LLC, Las Vegas, NV (US)

(*) Notice: Subject to any disclaimer, the term of this patent is extended or adjusted under 35 U.S.C. 154(b) by 101 days.

(21) Appl. No.: 17/977,612

(22) Filed: Oct. 31, 2022

(65) Prior Publication Data

US 2023/0050936 A1 Feb. 16, 2023

Related U.S. Application Data

(63) Continuation of application No. 16/946,551, filed on Jun. 26, 2020, now Pat. No. 11,488,439, which is a continuation of application No. 16/536,524, filed on Aug. 9, 2019, now Pat. No. 10,699,521, which is a continuation of application No. 15/149,410, filed on May 9, 2016, now Pat. No. 10,395,470.

(51) Int. Cl.
*G07F 17/32* (2006.01)

(52) U.S. Cl.
CPC ........ *G07F 17/322* (2013.01); *G07F 17/3209* (2013.01); *G07F 17/3211* (2013.01); *G07F 17/3244* (2013.01)

(58) Field of Classification Search
CPC ............... G07F 17/3209; G07F 17/322; G07F 17/3211; G07F 17/3244
See application file for complete search history.

(56) References Cited

U.S. PATENT DOCUMENTS

| | | | |
|---|---|---|---|
| 4,861,041 | A | 8/1989 | Jones et al. |
| 5,393,067 | A | 2/1995 | Paulsen et al. |
| 5,472,194 | A | 12/1995 | Breeding et al. |
| 5,664,781 | A | 9/1997 | Feola |
| 5,707,285 | A | 1/1998 | Place et al. |
| 5,743,800 | A | 4/1998 | Huard et al. |
| 5,911,418 | A | 6/1999 | Adams |

(Continued)

FOREIGN PATENT DOCUMENTS

| | | |
|---|---|---|
| AU | 2015203880 | 7/2015 |
| WO | 2000/016868 | 3/2000 |

OTHER PUBLICATIONS

Omaha hold 'em- Wikipedia, the free encyclopedia, "https:/len. wikipedia_org/w/index.php?title=Omaha_hold_27em&oldid= 722451289", May 28, 2016, 6 pages.

(Continued)

*Primary Examiner* — Reginald A Renwick
(74) *Attorney, Agent, or Firm* — WEIDE & MILLER, LTD.

(57) ABSTRACT

A gaming table includes input sensors which are configured to receive multiple inputs from a player. The sensors are linked to a gaming table controller and are configured to receive different types of inputs from players at different times. One input may comprise a wager input in the form of one or more chips which are associated with the sensor. Another input may comprise a game play input, such as a spin input for a bonus game, received by a player placing their hand proximate to the sensor.

17 Claims, 5 Drawing Sheets

(56) References Cited

U.S. PATENT DOCUMENTS

| | | | |
|---|---|---|---|
| 5,984,779 | A | 11/1999 | Bridgeman et al. |
| 6,206,373 | B1 | 3/2001 | Garrod |
| 6,299,534 | B1 | 10/2001 | Breeding et al. |
| 6,637,747 | B1 | 10/2003 | Garrod |
| 6,929,264 | B2 | 8/2005 | Huard et al. |
| 7,316,615 | B2 | 1/2008 | Soltys et al. |
| 7,566,274 | B2 | 7/2009 | Johnson et al. |
| 7,651,394 | B2 | 1/2010 | Johnson |
| 7,931,532 | B2 | 4/2011 | Johnson |
| 8,439,756 | B2 | 5/2013 | Baerlocher et al. |
| 8,740,692 | B2 | 6/2014 | Yoseloff et al. |
| 8,961,298 | B2 | 2/2015 | Czyzewski et al. |
| 9,478,099 | B2 | 10/2016 | Czyzewski et al. |
| 9,536,379 | B2 | 1/2017 | Czyzewski et al. |
| 9,662,563 | B2 | 5/2017 | Van Asdale et al. |
| 9,747,749 | B1 * | 8/2017 | Wisler ................ G07F 17/3248 |
| 9,811,980 | B1 | 11/2017 | Kowalchuk et al. |
| 2001/0031659 | A1 | 10/2001 | Perrie et al. |
| 2002/0195773 | A1 | 12/2002 | Dunn |
| 2003/0153377 | A1 | 8/2003 | Lisowski, Sr. |
| 2003/0202422 | A1 | 10/2003 | Bahar |
| 2004/0061288 | A1 | 4/2004 | Snow |
| 2004/0090005 | A1 | 5/2004 | Snow |
| 2004/0183254 | A1 | 9/2004 | Schlumbrecht |
| 2005/0107148 | A1 | 5/2005 | Webb |
| 2007/0126186 | A1 | 6/2007 | Crawford, III et al. |
| 2010/0087241 | A1 | 4/2010 | Nguyen et al. |
| 2010/0113120 | A1 | 5/2010 | Snow |
| 2011/0034237 | A1 | 2/2011 | Schulhof et al. |
| 2011/0316233 | A1 | 12/2011 | Hong et al. |
| 2012/0083341 | A1 | 4/2012 | George et al. |
| 2012/0244924 | A1 | 9/2012 | Willis |
| 2013/0157752 | A1 | 6/2013 | Yoseloff |
| 2014/0200071 | A1 * | 7/2014 | Czyzewski ......... G07F 17/3288 463/25 |
| 2015/0018083 | A1 | 1/2015 | Czyzewski et al. |
| 2015/0199871 | A1 | 7/2015 | Czyzewski et al. |
| 2015/0379821 | A1 | 12/2015 | LaDuca |
| 2017/0039799 | A1 | 2/2017 | Czyzewski et al. |
| 2017/0203198 | A1 | 7/2017 | Lysowski et al. |

OTHER PUBLICATIONS

State of Washington Gambling Commission, “Mississippi Stud Training Manual,” http://www.wsgc.wa.gov/activities/game-rules/mississippi-stud.pdf, Oct. 28, 2014, 17 pages.

State of Washington Gambling Commission, “Texas Hold ’Em Bonus Training Manual,” http://www.wsgc.wa.gov/activities/game-rules/texas-hold-em-bonus.pdf, Oct. 28, 2014, 15 pages.

State of Washington Gambling Commission, “Ultimate Texas Hold ’Em Training Manual,” http://www.wsgc.wa.gov/activities/game-rules/ultimate-texas-hold-em.pdf, Aug. 11, 2014, 23 pages.

Texas hold ’em—Wikipedia, the free encyclopedia, “https:/ /en_ wikipedia_org/w/index.php?title=Texas hold_ %27em&oldid=718982670”, May 6, 2016, 18 pages.

International Search Report and Written Opinion for Application No. PCT/US2017/031511, mailed Aug. 7, 2017, 19 pages.

International Search Report and Written Opinion for Application No. PCT/US2017/031560, mailed Aug. 9, 2017, 20 pages.

Shanghai Lanboa Sensing Technology Co., Ltd., “CR30S-Products,” http://www.shlanbao.cn/en/product/show.aspx?id=1139, Copyright 2011, printed Oct. 21, 2016, 2 pages.

STMicroelectronics, “VL6180X—Proximity sensor, gesture and ambient light sensing “ALS” module,” http://www.st.com/en/imaging-and-photonics-solutions/v16180x.html, Copyright 2016, printed Oct. 21, 2016, 6 pages.

International Search Report and Written Opinion for PCT/US2017/012156 mailed Mar. 13, 2017, 27 pages.

* cited by examiner

METHOD AND DEVICE FOR IMPLEMENTING WAGERING GAMES REQUIRING PLAYER INPUT

RELATED APPLICATION DATA

This application is a continuation of U.S. application Ser. No. 16/946,551, filed Jun. 26, 2020, which is a continuation of U.S. application Ser. No. 16/536,524, filed Aug. 9, 2019, now U.S. Pat. No. 10,699,521, which is a continuation of U.S. application Ser. No. 15/149,410, filed May 9, 2016, now U.S. Pat. No. 10,395,470, which prior applications are incorporated by reference as if fully set forth herein.

FIELD OF THE INVENTION

The present invention relates to methods of presenting and playing games and gaming devices configured to present games.

BACKGROUND OF THE INVENTION

Table games are a very popular form of wagering games. These games are referred to as table games because they are presented at a gaming table rather than at a gaming machine. These games include, but are not limited to, blackjack, poker, baccarat and other types of card games, as well as roulette, craps and other types of games.

In the case of card games, physical cards are dealt by a dealer to one or more players who sit at a table. The players may utilize physical gaming chips to place wagers and may be paid winnings by the dealer in the form of chips.

While these games may be implemented at the table using basic gaming equipment such as cards, dice, a roulette wheel or the like, some attempts have been made to utilize equipment to automate game play, reduce error and expedite game play, and/or implement various secondary features. For example, some gaming tables have been fitted with RFID sensors which are capable of reading and recording gaming chips, such as to automatically log player wagers to reduce dealer error associated with manually calculating the value of chips wagered by a player. Likewise, some gaming tables have been modified to implement secondary features, such as wheel spin bonuses and the like, such as described in U.S. Pat. No. 7,931,532.

While many attempts have been made to improve the configuration of gaming tables, a variety of problems still exist with these tables. For example, relative to spin features such as detailed in the '532 Patent, a mechanical spin button is connected to a controller via a cord. When a player is entitled to a bonus spin, the button must be passed from player to player across the gaming table. This is time consuming and can often result in inadvertent triggering of the button when it is passed by other players. Further, such equipment must be added to the gaming table in addition to the existing table game equipment, thus adding to the cost and complexity of the gaming table.

A new and improved method and device for implementing game play is desired.

SUMMARY OF THE INVENTION

Embodiments of the invention comprise methods of implementing and presenting games, gaming tables and gaming systems.

In one embodiment, a system for implementing a game at a gaming table relative to one or more players at player locations of the table comprises an input receiving device or sensor corresponding to each of the player locations, each input sensor configured to receive multiple player inputs, and at least one controller configured to receive, relative to a player's first input to a sensor at a first time, a wager input from the player; and receive, relative to a player's second input to the sensor at a second time, a game play input from the player.

In one embodiment of the invention, a gaming table comprises a playing surface, a plurality of player positions, each player position comprising at least one input sensor, a table controller, the table controller comprising at least one processor, at least memory, and at least one communication device interfaced to each input sensor, and machine readable code stored by said memory and executable by the table controller to receive, relative to a least one player, said player's first input to said at least one sensor at a first time, a wager input from said player and receive, relative to a player's second input to the sensor at a second time, a game play input from the player.

Another embodiment of the invention comprises a method of implementing a game at a gaming table which includes multiple player inputs comprising: receiving input from the player of at least one wager via the input sensor at a first time, receiving input from the player of a game input via the input sensor at a second time, and implementing a game feature based upon the game input received from the player.

In one embodiment, the input sensor(s) comprise proximity sensors, such as IR type proximity sensors. A first input to the sensor may comprise a wager input which is detected by the sensor when the player locates one or more wagering chips on or proximate to the sensor. A second input to the sensor may comprise a game input such as a "spin" input which is detected by the sensor when the player locates their hand or another body part on or proximate to the sensor.

In one or more embodiments, the input sensor(s) may be used in association with one or more indicators, such as lights or other elements which provide an indication to a user of one or more of: an indication that a sensor is ready for input, an indication that a sensor is deactivated, and an indication that an input has been received/confirmed.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise methods of implementing games and devices and systems for implementing or presenting games. In a preferred embodiment, the methods of game play and presentation are implemented relative to a gaming table.

Figure 1:
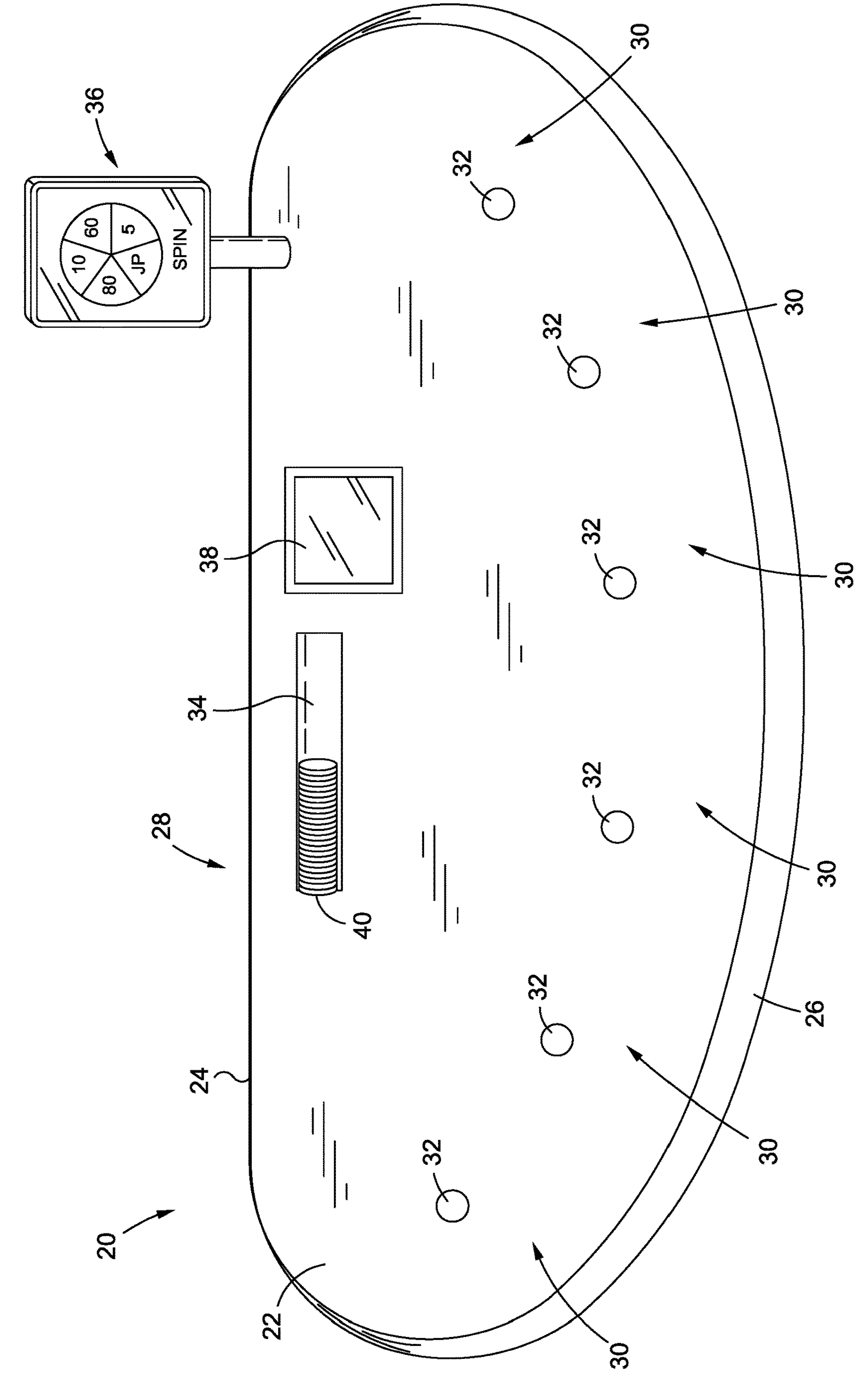
FIG. 1 illustrates a gaming table in accordance with one embodiment of the invention.

One embodiment of a gaming table in accordance with the invention will be described with reference to FIG. 1. As illustrated in FIG. 1, a game playing surface, such as a gaming table 20, is provided. The gaming table 20 defines a top or playing surface 22. The gaming table 20 may include one or more supports, such as a base, legs or the like (not shown) via which the playing surface 22 is elevated above a supporting surface such as a gaming floor.

The shape of the playing surface 22 may vary. In one embodiment, the gaming table 20 has a rear having a rear edge 24 which is generally straight and has an opposing front having a front edge 26 which is generally arcuate. A bumper or cushion may be located at either or both edges 24, 26.

In one embodiment, the playing surface 22 is generally planar. However, the playing surface 22 could have one or more raised areas and/or one or more depressed areas or other features. Various game-related information or features are preferably associated with the gaming table 20. In one embodiment, the playing surface 22 comprises a gaming felt or similar element(s) which are located over a substrate, such as a planar support. The gaming felt may bear various game play information or other information, such as by printing on the felt. This information may vary, such as depending upon the game or games which are to be implemented at the gaming table 20. For example, printing on the gaming felt may comprise one or more pay tables, card locations and the like.

In one embodiment, the configuration of the gaming table 20, such as via elements which are associated with the table 20 and information printed on the gaming felt, defines a dealer station 28 where a dealer may run a game, and one or more player positions 30. The dealer station 28 is generally located at the rear edge 24 and the player positions 30 are located opposite the dealer station 28 at the front or front edge 26. The dealer may, for example, stand at the rear of the table adjacent to the dealer station 28. A player may stand or sit adjacent to each player position 30 at the front of the gaming table 20.

In one embodiment, the game which is presented at the gaming table 20 comprises a wagering game. Wagers may be placed using physical gaming chips or other elements. In one embodiment, wagers by players may be sensed by detecting the association of one or gaming chips with one or more input receiving devices or input sensors 32. The input receiving devices or input sensors 32 preferably comprise proximity sensors. The input receiving devices 32 may be located in or on the gaming table 20 and are configured to detect inputs, such as provided by players at the playing surface 22. In the case of proximity sensors, the sensors may be any type of proximity sensor now known or later developed, such as IR, acoustic, capacitive, or the like. Of course, other types of sensors might be utilized.

In one embodiment, one or more input receiving devices 32 are associated with each player position 30, thereby providing a means for each player to provide input relative to game play at the gaming table.

In one embodiment, the dealer station 28 may include one or more chip trays 34 which are located on or at the gaming table 20 for storing chips which may be used to pay player winnings and/or in which chips which were used by players to place wagers may be collected.

In one embodiment, the gaming table 20 may include a number of other features. For example, the gaming table 20 may include one or more table displays 36. The table display 36 may comprise an electronic video display (such as an LCD, LED, OLED, DLP or other types of displays which are now known or later developed) or might even comprise a mechanical and/or electro-mechanical display device such as one or more spinning wheels or reels. The table display 36 may be located at or near the gaming table 20 for use in displaying game related information such as pay table information, game status information, game outcome information, bonus information or the like. The table display 36 might also be used to display promotional information or advertising.

The gaming table 20 might also comprise or include various input devices and/or other display devices. The input devices might include one or more dealer input devices such as one or more buttons or a dealer touchscreen display 38. For example, the dealer display 38 might comprise a display which displays game-related information to the dealer and allows the dealer to provide various inputs. Of course, various other types of input and display devices might be associated with the gaming table 20.

Additional details of a gaming table in accordance with one embodiment of the invention will be described with reference to FIG. 2. As illustrated, in this embodiment, elements of the gaming table 20 are associated with or connected to at least one table controller 100. The table controller 100 may be located at the gaming table 20 or may be remote therefrom.

In one embodiment, the table controller 100 comprises at least one processor 102 which is configured to execute machine readable code fixed in a tangible medium (e.g. "software"). The table controller 100 may also comprise one or more information or data storage devices 104. These data storage devices 104 may comprise any type of data storage device such as ROM, RAM, EPROM or the like, as well as mass storage devices such as hard drives. The data storage devices 104 may store various data, including game code or software which is executable by the processor(s) 102 and other data, such as game data including wager data, game outcome data, images, etc.

The table controller 100 preferably includes one or more communication interfaces 106. The communication interface(s) 106 may facilitate wireless and/or wired communications with one or more remote systems or devices in accordance with various protocols (USB, Wi-Fi, Bluetooth, Ethernet, Firewire, etc.). In one embodiment, data or information may be exchanged between the processor(s) 102, data storage device(s) 104 and communication interface(s) 106 via one or more interfaces, such as a system bus 108. Of course, the table controller 100 might have other configurations, including other elements or features.

Figure 2:
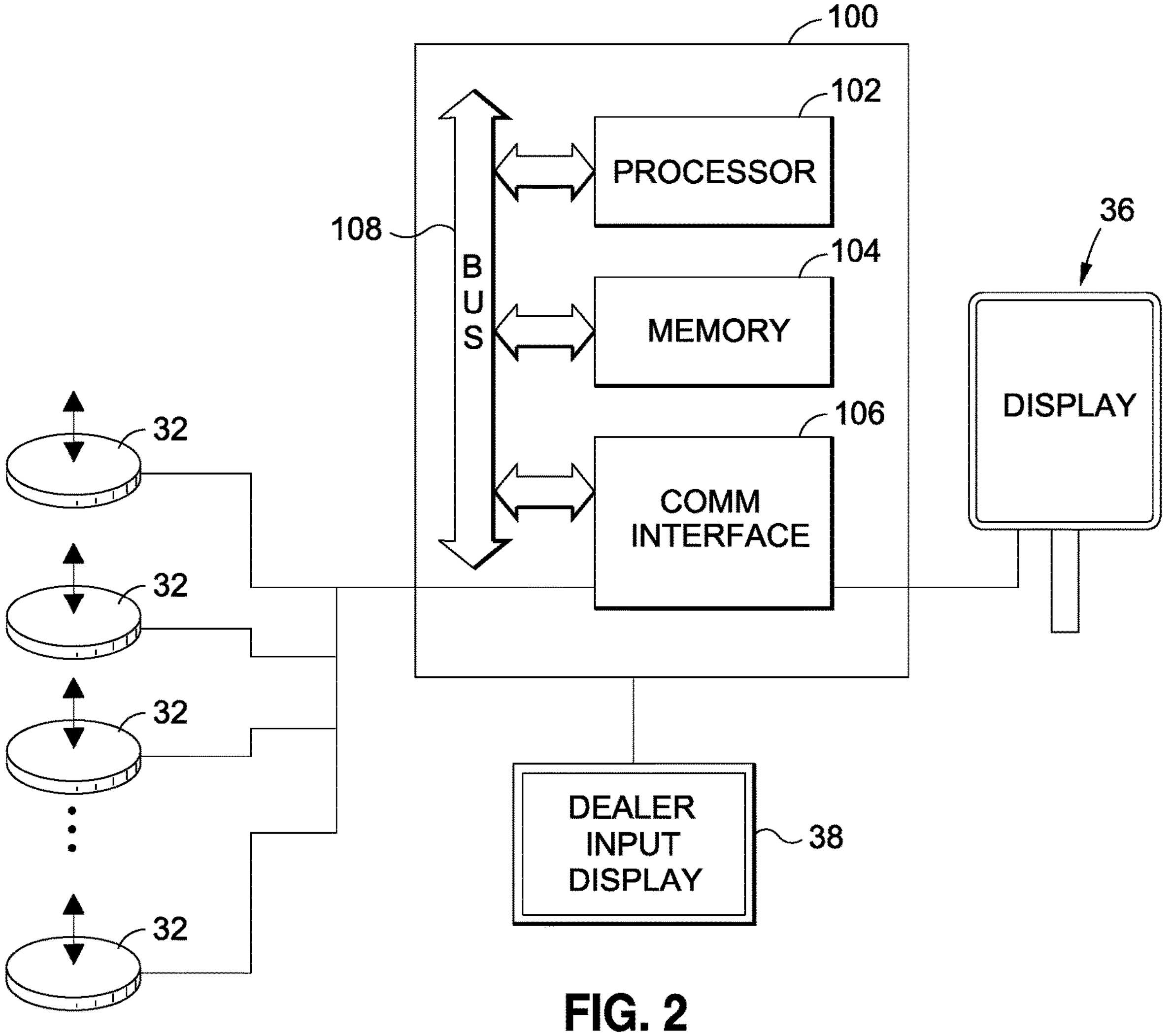
FIG. 2 is a block diagram of elements of a gaming table in accordance with the present invention.

As illustrated in FIG. 2, the one or more input receiving devices 32 of the gaming table 20 may be interfaced with the table controller 100 to that the table controller 10 may receive information from those devices 32 and, in some embodiments, to transmit information to those devices. Likewise, the dealer input and/or display devices, such as the dealer touchscreen 38, may be interfaced to the table controller 100. Also, other input and/or display devices such as the table display 36 may be interfaced to the table controller 100.

Additional details of a method and devices and systems of the invention will now be described. In one embodiment of a method of the invention, the one or more input receiving devices 32 are configured to receive multiple inputs. Preferably, each input receiving device 32 is configured to receive two or more inputs. Most preferably, those inputs are game-related inputs by a player and comprise two or more different types of inputs at two or more different times.

In one or more embodiments of the invention, aspects of the input receiving devices 32 and/or other devices or elements may be controlled or utilized to facilitate the receipt of the different player inputs. For example, as described below, the input receiving devices 32 and/or the table controller 100 may be configured to control the receipt of inputs, such as by selectively activating and deactivating the input receiving devices 32 so that they will receive input at certain times, but not others. In other embodiments of the invention described below, the configuration of the input receiving devices 32 may change to facilitate the input(s), such as by changing a detecting sensitivity to detect an intended player input from an unintended input. In yet other embodiments described herein, one or more secondary elements, such as audible and/or visual indicators may be used in conjunction with the input receiving devices 32 to facilitate the input receiving functionality of the input receiving devices 32.

In one example embodiment of the invention, a wagering game may be presented at the gaming table 20. The game may have a base game portion and a secondary or bonus game portion. For example, the base game portion may comprise a card game which is played with one or more decks of physical playing cards. The bonus game might comprise a bonus wheel spin for a potential bonus award. As detailed herein, however, other types or configurations of games which require player input may be implemented relative to the invention.

Figure 4:
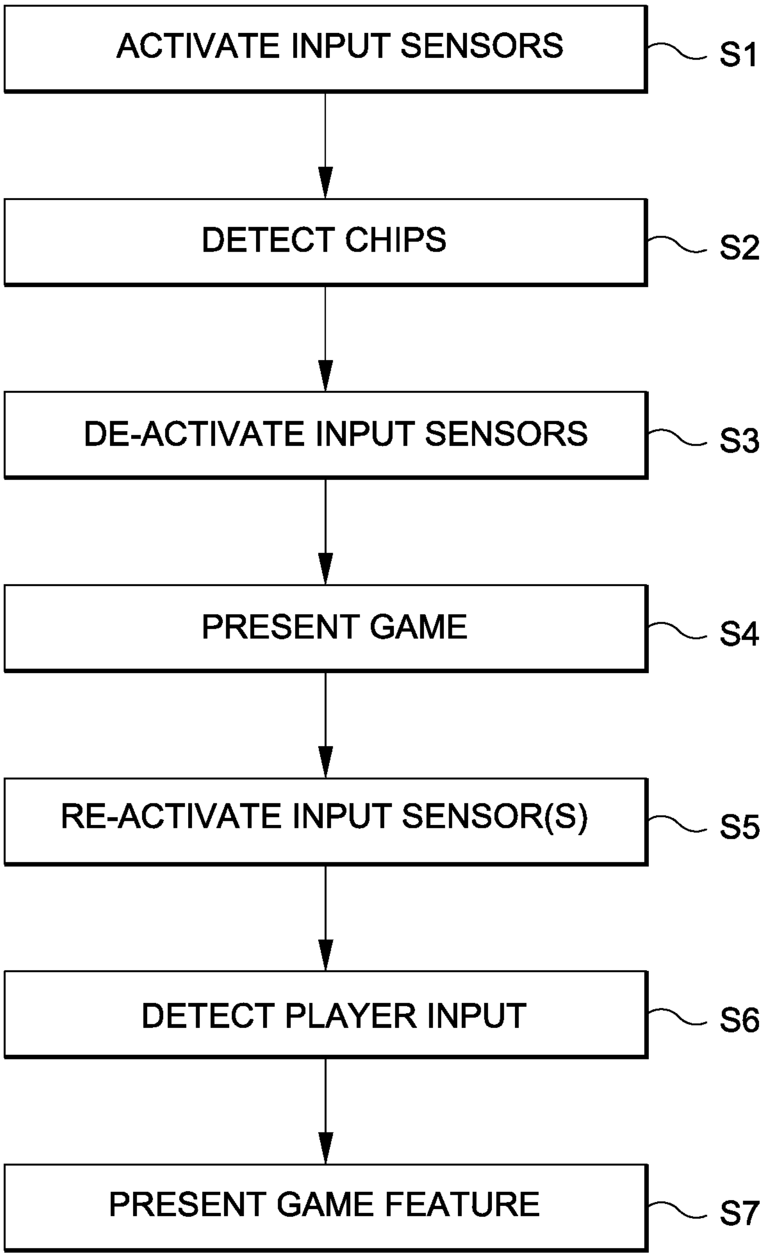
FIG. 4 is a flow diagram of a method in accordance with one embodiment of the invention.

FIG. 4 illustrates one embodiment method where the input receiving devices 32 may be activated and deactivated at certain times relative to the receipt of inputs thereto. In this example embodiment, in a step S1, the one or more input receiving devices input sensors 32 may be activated for input. In one embodiment, the input receiving devices 32 may be turned off or be configured to not receive inputs except during designated times. This prevents, for example, inadvertent inputs from being received when games are not being presented or when other activities are occurring. For example, it may be preferable for the input receiving devices 32 to not receive inputs between games or during certain portions of the game.

In one embodiment, the input receiving devices 32 may be turned off by providing an instruction to them to not receive or transmit inputs. In other embodiments, the table controller 100 could be configured to ignore input signals from the input receiving devices 32.

In accordance with step S1, the input receiving devices 32 may be "activated", such as by turning them on or by causing the table controller 100 to be configured to receive inputs from the input receiving devices 32. This step may be implemented by a dealer, such as by input to the one or more dealer input devices. For example, the dealer display 38 might display a "start game/receive wagers" button which the dealer may select. In response to that input, the table controller 100 may be configured to receive inputs from the input receiving devices 32 or may send control instructions to those devices to cause them to be activated.

In a step S2, one or more first inputs may be provided to the one or more input receiving devices 32. This may comprise, for example, a first type of input such as a wager input, such as via the detection of one or more chips.

In one embodiment, each player who wishes to play the game may be required to place one or more wagers. The player might optionally be permitted to place other wagers. For example, a player might be required to place one or more base wagers to play the game and might be permitted to optionally place a bonus wager. In one embodiment, one or more input receiving devices 32 are associated with each player position 30. More than one input receiving device 32 may be provided relative to each player, such as for receiving a base wager and a bonus wager.

Figure 3A:
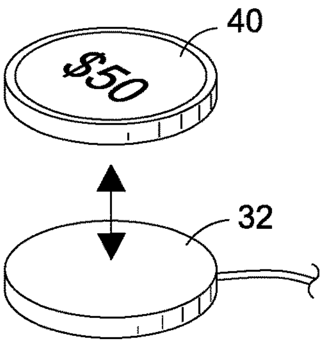
FIGS. 3A and 3B illustrate first and second inputs to an input receiving device in accordance with the present invention.

In one embodiment, a wager input may be provided by a player placing one or more chips 40 on or adjacent to a particular input receiving device 32, such as illustrated in FIG. 3A. At that time, the wager input(s) may be detected by those devices 32 and may be transmitted to the table controller 100 for processing. Wager information may be displayed to the dealer, such as via the dealer display 38. The dealer might then collect the wagers and place the wagered chips in the chip tray 34.

In one embodiment, as in step S3, after a first input period, the input receiving devices 32 may again be de-activated. Once again, this may comprise a dealer providing input to the dealer input device(s), such as the dealer touchscreen 38. For example, the dealer touchscreen 38 might display a "close wager" button which the dealer may select. This may cause the table controller 100 to no longer receive inputs from the input receiving devices 32 and/or to send a control instruction to those devices to de-activate them.

In a step S4, one or more steps of a game may be implemented. For example, relative to a card game, the dealer might deal hands of cards to player and/or dealer hands. Players and/or the dealer might elect to hold or discard cards or the like. Of course, the actual steps of the game may depend upon the particular game which is being implemented.

At one or more times, the input receiving devices 32 may be configured to receive one or more additional or second inputs. Such a secondary input might comprise a secondary or other additional wagers. In one embodiment, at least one secondary input comprises a different type of input than the first input.

In order to receive the at least one secondary input, the input receiving devices 32 may again be re-activated, as in step S5. In one embodiment, only certain input receiving devices 32 may be activated. For example, in one embodiment of a game, a player who placed a bonus wager and received a certain bonus-triggering result from the play of a base game might be permitted to participate in a bonus event. That bonus event might comprise, for example, a bonus wheel spin which offers the player a chance for a bonus win. Thus, the input receiving devices 32 corresponding to only those players who are entitled to participate in the bonus event might be activated. The input receiving devices 32 relative to the other players preferably remain inactive, such as to prevent accidental input thereto.

Figure 3B:
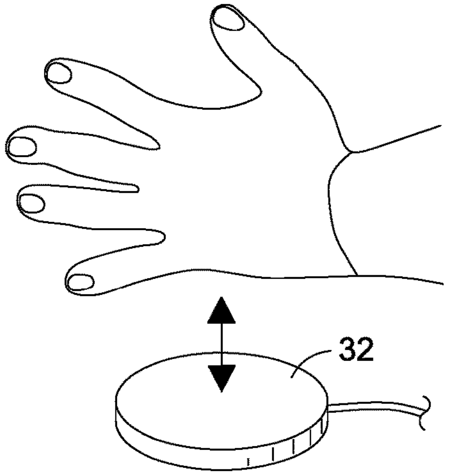

In a step S6, the input receiving device 32 may receive an input. In one embodiment, this may comprise a player placing their hand, one or more fingers or another body part or the like on or adjacent to the input receiving device 32, such as illustrated in FIG. 3B.

In a step S7, one or more game features or the like may be implemented by the table controller 100 and/or dealer in response to the received input. For example, in response to the detection of a player's hand, an input receiving device 32 may send a signal to the table controller 100. The table controller 100 may then be configured to cause the table display 36 to display the image of a wheel which rotates and then stops at a selected bonus location, such as illustrated in FIG. 1. The bonus spin outcome may result in the player being awarded a bonus win. Of course, this process might be repeated relative to each player who is entitled to a bonus spin. In one embodiment, the input receiving device 32 corresponding to a first player is activated and receives an input from that player, the bonus element or other feature is implemented and then that input receiving device 32 may be inactivated. The input receiving device 32 relative to a second player may then be activated, and so on.

One aspect of the invention is a method and gaming device via which a single input receiving device may receive multiple inputs, and more preferably different types of inputs. For example, the different types of inputs may be a wagering chip input and an input from a player's hand or other body part. Preferably, the device is configured to receive or detect these different inputs at different times.

The use of an individual device to receive different player inputs at the gaming table has a number of benefits. One benefit is that it reduces the number of devices or elements which are required to detect or receive player inputs, thus reducing the cost and complexity of the system. In accordance with the invention, for example, a single proximity sensor may be located at each player position 30. This single proximity sensor may be used to detect wager inputs, but also spin or other secondary player inputs.

The use of input receiving devices for each player also eliminates problems associated with shared player input devices. For example, in accordance with the system as described herein, the players and/or dealer do not need to pass a mechanical button around the table from player to player in order to receive inputs. This shortens the time for presenting the game and reduces erroneous button inputs.

The invention may have other features and configurations. For example, the system of the invention may be implemented relative to a variety of different types of games and game features. For example, the input receiving devices 32 could be configured to receive multiple wager inputs and other and/or additional player inputs other than a "spin" input. The types of inputs might vary depend upon the game, such as the number of different permitted wagers, the type of game features such as bonus features and the like. For example, the input receiving devices 32 could receive other types of player inputs during game play, such as to confirm certain game elections, etc. Further, the input receiving devices might be activated and de-activated at different times, such as depending upon the various game elements. As one example, a game might include the option for an initial ante wager and a bonus wager, then the implementation of one or more steps (such as the dealing of initial hands), then the option of a call wager, then one or more additional steps, etc. Further, a game might include multiple bonus features or other elements which require player inputs, such as a "spin" input, a "trade" input or various other inputs relative to particular actions.

Figure 5:
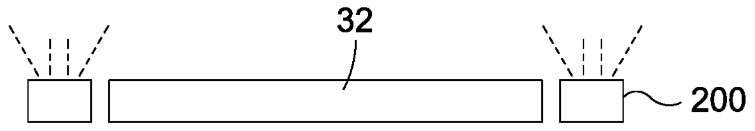
FIG. 5 illustrates an input receiving device having an associated indicator in accordance with one embodiment of the invention.

As indicated above, in one embodiment, the system might include one or input receiving device indicators. These indicators might comprise, for example, audible and/or visual indicators. The indicators may provide an indication, such as by sound, light (including color), text or the like, of a status of an input receiving device 32 or an activity associated therewith. As one example, a visual indicator such as a color or multi-color light ring 200 might be located around an input receiving device, such as illustrated in FIG. 5. Of course, such an indicator might otherwise be located adjacent to an input receiving device 32 or even over such a device. The indicator lights might be located inside the device if the device is equipped with a translucent surface.

In one embodiment, the indicator(s) might provide an indication or information to a user comprising one or more of: (1) an inactive status of the input receiving device; (2) an active or ready for input status of the input receiving device; and (3) accepted or received input to the input receiving device. In one embodiment, the one or more indicator(s) are controlled in conjunction with the input receiving devices, such as via the table controller.

As one example, when an input receiving device is inactivate, an associated indicator (such as a light ring around the input receiving device) might be illuminated red. When it is active, and ready for a particular input, it might be illuminated flashing green. When an input is received, the flashing green light might transition to a steady green light.

Figure 6A:
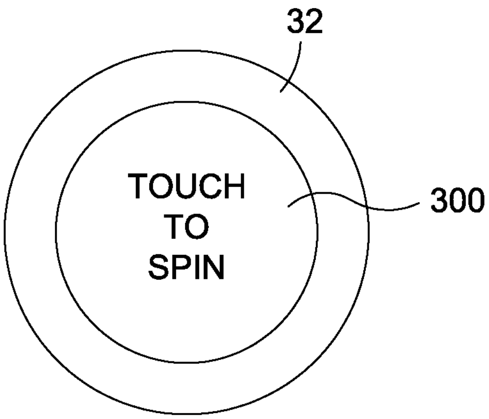
FIGS. 6A and 6B illustrate an input receiving device having an associated indicator in accordance with another embodiment of the invention.
Figure 6B:
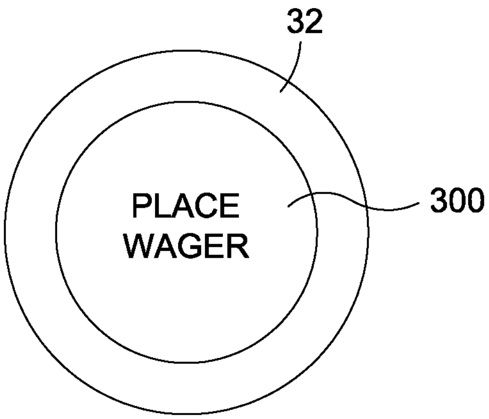

In another embodiment, text or other instructions might be displayed by the one or more associated indicators. For example, as illustrated in FIGS. 6A and 6B, a video screen 300 may be located over or may be located adjacent to an input receiving device 32. The video screen 300 might display "place wager" when the input receiving device is configured to receive a wager (as shown in FIG. 6B) and might display "touch to spin" or other instructions when the input receiving device is configured to receive a player spin input (as shown in FIG. 6A).

Of course, the indicator(s) may have various configurations. Preferably, the indicator(s) are located adjacent to or are associated with (and may even be integrated with) the input receiving device(s) 32.

Figure 7:
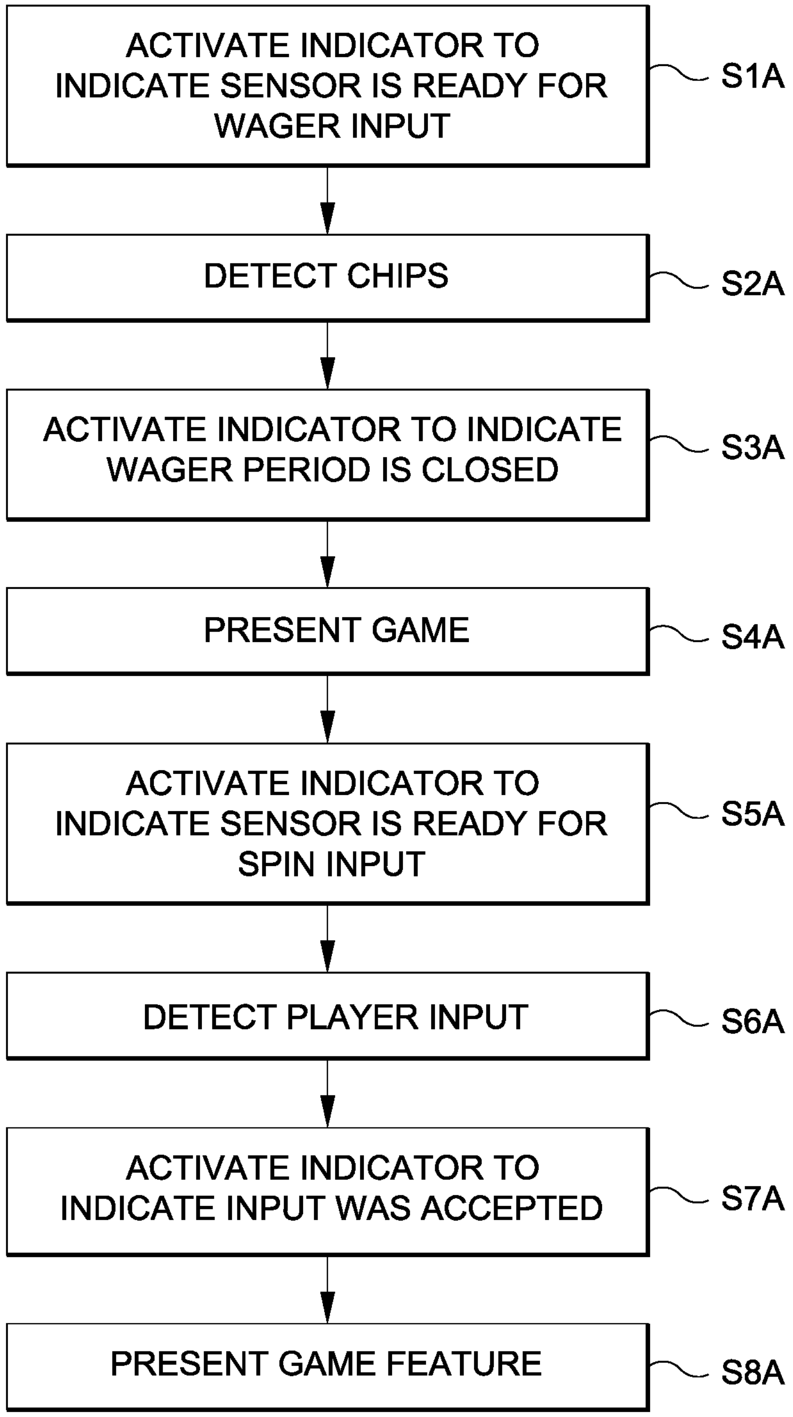
FIG. 7 is a flow diagram of a method in accordance with another embodiment of the invention.

FIG. 7 is a flow diagram of a method of the invention for implementing a game similar to that described above (e.g. a base game with a bonus spin feature) where one or more indicators are utilized. In this example, in a step S1A, an indicator associated with an input receiving device or sensor 32 may be activated to indicate to a player that their input receiving device 32 is ready to accept a wager. This might comprise, as indicated above, causing the indicator to illuminate a flashing green light, to cause a display to show a "place wager" instruction or the like. In a step S2A, the input receiving device 32 may receive an input in the form of one or more chips placed by the player.

In a step S3A, the indicators may then be activated to indicate that the wager period is closed. This might comprise, for example, the indicators being illuminated red or displaying a "wagers closed" instruction or the like. In a step S4A, one or more steps of the game may be implemented.

In a step S5A, an indicator may be activated to indicate that an associated input receiving device or sensor 32 is ready for a bonus spin input. This may comprise the indicator illuminating a flashing green light, showing a "touch to spin" instruction or the like. In a step S6A, a player's input to the associated input receiving device 32 may be detected.

In one embodiment, as in step S7A, the indicator may be activated to indicate that the input was received from the player. For example, once the input receiving device 32 detected the player input and sent information regarding this input to the table controller 100, the table controller 100 may cause the indicator display a steady green light or to display an "input received" indication.

In a step SBA, the game feature might then be implemented based upon the player input.

Of course, at a gaming table where multiple players are playing, the indicators may indicate a particular status of an input receiving device corresponding to each player, where the status may vary from player to player. This allows the indicators to provide information to each player which is unique to that player. For example, during a bonus spin phase, only the indicator associated with the input receiving device of a player whose turn it is to spin the bonus wheel may indicate such (while the indicators associated with the input receiving devices of the other players may indicate that no input is to be provided by those players).

As with the prior embodiment, the steps in FIG. 7 may vary depending upon the particular game and the like, and is merely one example. For example, the indicators might always be activated in a manner which confirms a player input, whether of a wager or a direct input, rather than just a player's direct input. In one embodiment, the status of the indicators may be automatically controlled by the table controller 100 or might be controlled by the dealer, or both. For example, a dealer might provide input which opens and closes a wagering period. When the dealer opens the wagering period, the indicators (via control from the table controller based upon the dealer's input) might indicate that the input receiving devices 32 are ready to receive wagers and when the dealer closes the wagering, the indicators may indicate that no more wagering inputs are being accepted (again as controlled from the table controller based upon the dealer's input).

As indicated herein, in one embodiment, input receiving device(s) 32 may move between active and inactive conditions. While the dealer may provide inputs to the table controller 100 to control input receiving device activation and de-activation, such might be at least partially automated. For example, in response to a dealer selecting a "start game" option, the table controller 100 might activate the input receiving devices 32 for purposes of receiving player wagers. The table controller 100 might automatically close wagering after a certain time, such as 1 minute, but automatically de-activating them.

In another embodiment of the invention, the input receiving device(s) 32 might always be active or might be inactive between games but always active during game play. In this embodiment, in order to reduce chance of inadvertent input to the input receiving devices(s), the indicators described above might be utilized. For example, instead of an input receiving device being truly inactivated, the associated indicator may indicate to a player that they should not provide an input to the device (although if the player did, such an inadvertent input might then still be registered).

In one embodiment, the input receiving device(s) 32 may be controlled to change one or more characteristics thereof, such as a sensitivity of the device. As one example, the table controller 100 or another controller might be used to implement a first input sensitivity of an input receiving device, such as relative to the detection of one or more chips, but another or second input sensitivity at another times. For example, an input sensitivity or similar characteristic might be controlled in order to reduce the chances for inadvertent input to the input receiving device 32, such a player's hand inadvertently passing over or near the device. This feature might be used, for example, to distinguish between a true "spin" input (or other input from the player) which is provided by a player's hand or the like, and an inadvertent passing of a portion of the player's hand or another object near the sensor which is not intended as an input. As another example, the input receiving device 32 might be configured to require an input of a length of time, such via detection of a player's hand adjacent to the input receiving device(s) for a period of time which would essentially avoid in inadvertent input from being logged. This type of input receiving device control, particularly relative to a proximity sensor, has particular applicability to the invention where the game may require multiple inputs from a player, including different types of inputs, during different times of the game.

The gaming table 20 of the invention may include or be associated with other elements or devices. For example, the gaming table 20 might include other gaming equipment, such as depending upon the particular game which is being implemented. As one example, the gaming table 20 might include a roulette wheel, card shoe(s), card reader(s), card shuffler(s) and the like. The gaming table 20 might also be connected to external devices. For example, the table controller 100 might be connected to one or more casino servers, such as a casino accounting server which tracks game play at each gaming table 20, such as relative to the amounts of wagers placed and winnings paid to the players, among other information. The gaming table 20 might also be connected to a player tracking server and include player tracking elements such as player card readers.

The gaming system might include other elements, such as input receiving device controllers or the like. For example, a proximity-type input sensor might be configured as a USB type device having a USB controller. The table controller 100 may be configured to control the proximity device as a USB device. In this regard, the processor 102 and/or one or more sub-processors or controllers may be utilized to control the input receiving devices.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of receiving inputs from a player relative to a game at a gaming table, comprising the steps of:

activating an input sensor for receiving a first input from the player;

activating a first visual indicator associated with the input sensor to indicate that the input sensor has been activated to receive the first input;

deactivating the input sensor from receiving the first input;

activating a second visual indicator associated with the input sensor to indicate the input sensor is deactivated;

activating the input sensor for receiving a second input from the player;

activating a third visual indicator associated with the input sensor to indicate that the input sensor is configured to receive the second input;

deactivating the input sensor from receiving the second input; and activating a fourth visual indicator associated with the input sensor to indicate the input sensor is deactivated.

2. The method in accordance with claim 1, further comprising, registering said first input as a wager input by said player when said first input is received during a first period of time while said input sensor is activated to receive said first input, and registering said second input as a game play input by said player when said second input is received during a second period of time while said input sensor is activated to receive said second input.

3. The method in accordance with claim 1, wherein said first visual indicator comprises a flashing light of a first color, wherein said second visual indicator comprises a steady light of a second color, wherein said third visual indicator comprises said flashing light of said first color, wherein said fourth visual indicator comprises said steady light of said second color, wherein said first and second colors are different from one another.

4. The method in accordance with claim 1, wherein at least one of said first, second, third, and fourth visual indicators comprises a flashing light.

5. The method in accordance with claim 1, wherein at least one of said first, second, third, and fourth visual indicators comprises a light ring disposed around said input sensor.

6. The method in accordance with claim 1, wherein activating the input sensor for receiving said first input comprises enabling said input sensor to receive said first input.

7. The method in accordance with claim 1, wherein said first input comprises association of at least one wager chip with said input sensor.

8. The method in accordance with claim 1, wherein said second input comprises said player placing a body part proximate to or in contact with said input sensor.

9. The method in accordance with claim 1, wherein said first visual indicator comprises light of a first color and said second visual indicator comprises light of a second color.

10. A system for receiving inputs from a player relative to a game at a gaming table, the system comprising:

an input sensor associated with said table; and a controller, said controller comprising a processor, a memory, a communication interface, and machine readable code stored in said memory and executable by said processor to:

activate an input sensor for receiving a first input from the player;

activate a first visual indicator associated with the input sensor to indicate that the input sensor has been activated to receive the first input;

deactivate the input sensor from receiving the first input;

activate a second visual indicator associated with the input sensor to indicate the input sensor is deactivated;

activate the input sensor for receiving a second input from the player;

activate a third visual indicator associated with the input sensor to indicate that the input sensor is configured to receive the second input;

deactivate the input sensor from receiving the second input; and activate a fourth visual indicator associated with the input sensor to indicate the input sensor is deactivated.

11. The system in accordance with claim 10, wherein said machine readable code stored in said memory and executable by said processor is configured to register said first input as a wager input by said player when said first input is received during a first period of time, and register said second input as a game play input by said player when said second input is received during a second period of time.

12. The system in accordance with claim 10, wherein said first visual indicator comprises a flashing light of a first color, wherein said second visual indicator comprises a steady light of a second color, wherein said third visual indicator comprises said flashing light of said first color, wherein said fourth visual indicator comprises said steady light of said second color, wherein said first and second colors are different from one another.

13. The system in accordance with claim 10, wherein at least one of said first, second, third, and fourth visual indicators comprises a flashing light.

14. The system in accordance with claim 10, wherein at least one of said first, second, third, and fourth visual indicators comprises a light ring disposed around said input sensor.

15. The system in accordance with claim 10, wherein said first input comprises an association of at least one wager chip with said input sensor.

16. The system in accordance with claim 10, wherein said second input comprises said player placing a body part proximate to or in contact with said input sensor.

17. The system in accordance with claim 10, wherein said first visual indicator comprises light of a first color and said second visual indicator comprises light of a second color.

* * * * *